(12) United States Patent
Wight

(10) Patent No.: US 6,610,132 B1
(45) Date of Patent: Aug. 26, 2003

(54) COMPOSITIONS CONTAINING A LIQUID MEDIUM AND AN AZO DYE

(75) Inventor: Paul Wight, Blackley (GB)

(73) Assignee: Avecia Limited, Blackley (GB)

( * ) Notice: Subject to any disclaimer, the term of this patent is extended or adjusted under 35 U.S.C. 154(b) by 0 days.

(21) Appl. No.: 09/787,285

(22) PCT Filed: Sep. 13, 1999

(86) PCT No.: PCT/GB99/03025

§ 371 (c)(1),
(2), (4) Date: Mar. 15, 2001

(87) PCT Pub. No.: WO00/15723

PCT Pub. Date: Mar. 23, 2000

(30) Foreign Application Priority Data

Sep. 16, 1998 (GB) .............................. 9820176

(51) Int. Cl.⁷ ..................... C09D 11/00; C09B 29/09; C09B 33/048; B05D 1/26; B32B 27/14
(52) U.S. Cl. .................... 106/31.48; 534/803; 8/673; 8/674; 427/466; 428/32.1
(58) Field of Search ............. 106/31.48; 534/803; 8/673, 674; 427/466; 428/195, 32.1

(56) References Cited

U.S. PATENT DOCUMENTS 3,454,551 A  *  7/1969  Mangini et al. ............ 534/634
5,993,525 A  * 11/1999  Sano et al. ............... 106/31.48

FOREIGN PATENT DOCUMENTS

| EP | 0 468 648 | 1/1992 | |
| EP | 0 717 089 | 6/1996 | |
| EP | 0 866 105 | 9/1998 | |
| GB | 2 308 377 | 6/1997 | |
| GB | 2353533 A | * 2/2001 | ........... C09B/43/40 |
| JP | 11320921 A2 | * 5/1998 | |
| JP | 11-209674 A | * 6/1999 | |
| JP | 2000-178463 A | * 6/2000 | |
| JP | 2001-354881 A | * 12/2001 | |

OTHER PUBLICATIONS

Derwent abstract of JP 2000–178463, Jun. 2000.*
Derwent abstract of JP 11–209674, Aug. 1999.*
Derwent abstract of JP11–320921, Nov. 1999.*
Derwent abstract of JP 2001–354881, Dec. 2001.*

* cited by examiner

Primary Examiner—Helene Klemanski
(74) Attorney, Agent, or Firm—Pillsbury Winthrop LLP

(57) ABSTRACT

A composition comprising:
(a) a liquid medium comprising (i), (ii) or (iii):
(i) a mixture of water and an organic solvent;
(ii) an organic solvent free from water; or
(iii) a low melting point solid; and
(b) a dye of the Formula (1) or a salt thereof:

Formula (1)

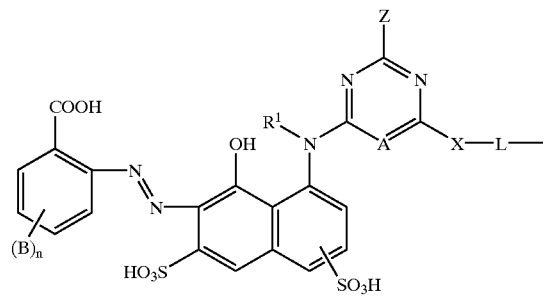

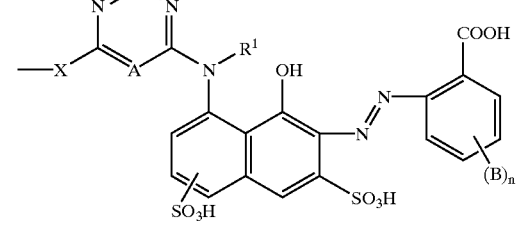

wherein A, B, Z, L, $R^1$ and n are as defined in the description. Also claimed are certain dyes of Formula (1), inks, an ink jet printing process using the inks, a substrate printed with the inks, an ink jet printer cartridge containing the inks and an ink jet printer containing the ink jet printer cartridge.

27 Claims, No Drawings

COMPOSITIONS CONTAINING A LIQUID MEDIUM AND AN AZO DYE

This application is the national phase of international application PCT/GB99/03025 filed Sep. 13, 1999 which designated the U.S.

This invention relates to compositions, to inks and to dyes and to their use in ink jet printing ("IJP"). IJP is a non-impact printing technique in which droplets of ink are ejected through a fine nozzle onto a substrate without bringing the nozzle into contact with the substrate.

There are many demanding performance requirements for dyes and inks used in IJP. For example they desirably provide sharp, non-feathered images having good water-fastness, light-fastness and optical density. The inks are often required to dry quickly when applied to a substrate to prevent smudging, but they should not form a crust over the tip of an ink jet nozzle because this will stop the printer from working. The inks should also be stable to storage over time without decomposing or forming a precipitate which could block the fine nozzle.

According to a first aspect of the present invention there is provided a composition comprising:
(a) a liquid medium comprising (i), (ii) or (iii):
  (i) a mixture of water and an organic solvent;
  (ii) an organic solvent free from water; or
  (iii) a low melting point solid; and
(b) a dye of the Formula (1) or salt thereof:

Formula (1)

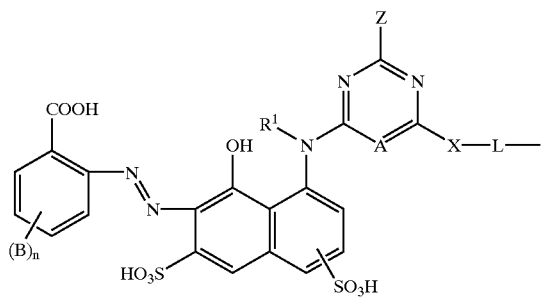

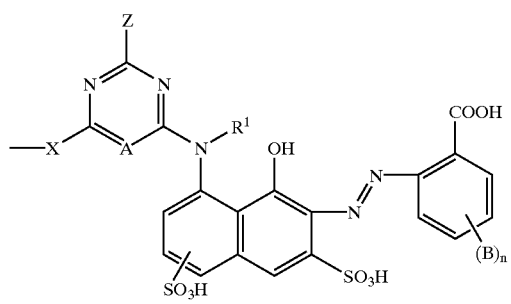

-continued wherein:

each A independently is N, C—Cl, C—CN or C—$NO_2$;

each B independently is a substituent other than —COOH;

L is optionally interrupted alkylene, optionally substituted by halo or —OH, wherein the optional interruption(s) are selected from —O—, —S—, —$NR^1$—, —$CR^1$=$CR^1$—, —C(O)— and —C(O)O—;

each Z independently is —$SR^2$, —$OR^3$, —$NR^4R^5$ or a labile atom or group;

each X independently is —S—, —O— or —$NR^1$—;

each $R^1$ independently is H or optionally substituted alkyl;

$R^2$, $R^3$, $R^4$ and $R^5$ are each independently H, optionally substituted alkyl, optionally substituted aryl or optionally substituted aralkyl; or $R^4$ and $R^5$ together with the nitrogen to which they are attached form an optionally substituted five or six membered ring; and each n independently is 0 to 4.

Preferably the dye of Formula (1) is not of the Formula (A), (B), (C) or (D):

Formula (A)

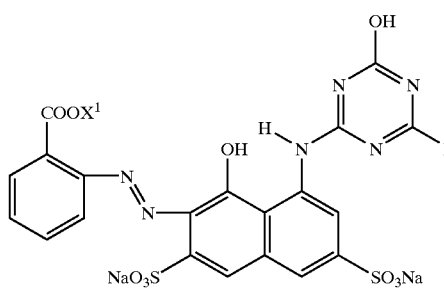

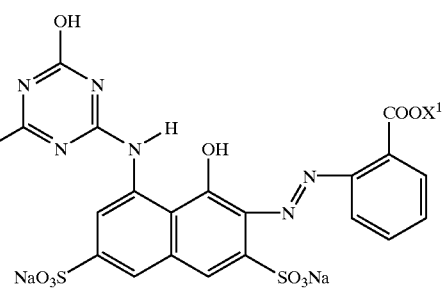

wherein $X^1$ is H or Na;

Formula (B)

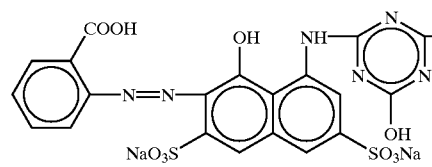

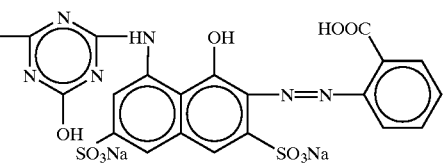

Formula (C)

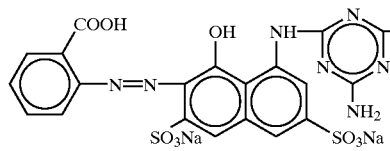 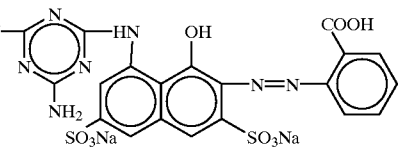

Formula (D)

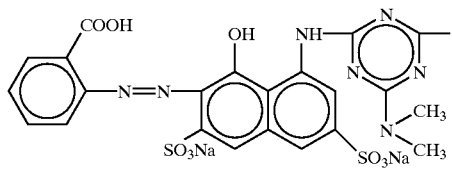 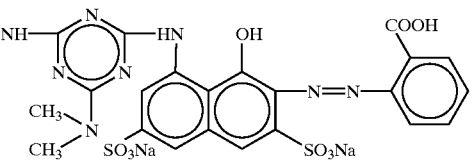

Preferably the composition has a concentration of less than 100 parts per million in total of halide ions and divalent and trivalent metal ions.

Preferably the group —XLX— shown in Formula (1) is not of the Formula (E), (F), (G), (H), (I) or (J):

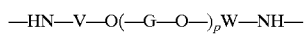  Formula (E)

wherein: V and W each independently represents a linear or branched alkylene group having from 1 to 8 carbon atoms; G represents a linear or branched alkylene group having from 1 to 2 carbon atoms or the following formula (a):

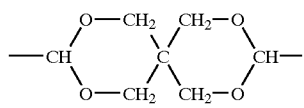 (a)

and p represents a number of from 0 to 20;

Formula (F)

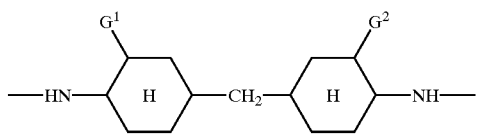

wherein $G^1$ and $G^2$ each represents a hydrogen atom or a methyl group;

Formula (G)

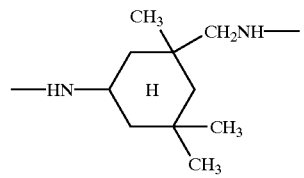

Formula (H)

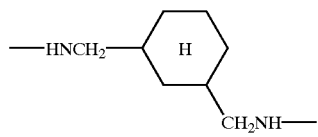

Formula (I)

—HNCH$_2$—[bicyclic]—CH$_2$NH— or

Formula (J)

—HN—[tricyclic]—NH—.

Preferably each A is N.

Preferably each $R^1$ independently is H or optionally substituted $C_{1-6}$alkyl, more preferably H or $C_{1-4}$-alkyl optionally substituted by —OH, —COOH, —SO$_3$H or —CN. It is especially preferred that each $R^1$ independently is methyl, ethyl or H, more especially H.

Each X independently is preferably —S— or —NR$^1$—, more preferably —NR$^1$— and especially —NH—.

Each B independently is preferably —SO$_3$H, —PO$_3$H$_2$,—CF$_3$, optionally substituted alkoxy, optionally substituted alkyl, optionally substituted amino, halo, —CN, —SO$_2$—T, —OH or —NO$_2$, wherein T is optionally substituted alkyl, optionally substituted aryl, vinyl, or a group convertible to vinyl on treatment with aqueous alkali. When T is a group which is convertible to vinyl on treatment with aqueous alkali it is preferably of the formula —CH$_2$CH$_2$OSO$_3$H, —CH$_2$CH$_2$SSO$_3$H, —CH$_2$CH$_2$Cl or —CH$_2$CH$_2$OCOCH$_3$. More preferably T is —CH=CH$_2$ or —CH$_2$CH$_2$OSO$_3$H and especially —CH=CH$_2$.

More preferably each B independently is —SO$_3$H, —PO$_3$H$_2$, —CF$_3$, optionally substituted $C_{1-10}$-alkoxy, optionally substituted $C_{1-10}$-alkyl, optionally substituted amino, —SO$_2$CH=CH$_2$, —F, —Cl, —CN, —OH or —NO$_2$. When B is substituted the substituent(s) is/are preferably selected from $C_{1-6}$-alkyl, $C_{1-6}$-hydroxyalkyl, $C_{1-6}$-alkoxy, $C_{1-4}$-alkylCO, —OH, —SO$_3$H, —COOH, —CN, —PO$_3$H$_2$, halo and —NH$_2$.

Still more preferably each B independently is —SO$_3$H, —CF$_3$, amino, —NHCOC$_{1-4}$-alkyl, $C_{1-6}$-alkoxy or $C_{1-6}$-alkyl optionally substituted by —OH, —COOH, —NH$_2$ or —SO$_3$H. It is especially preferred that each B independently is $C_{1-4}$-alkyl or —NHCOC$_{1-4}$-alkyl, more especially methyl, ethyl or —NHCOCH$_3$.

Preferably each n independently is 0, 1 or 2, more preferably 0.

When $R^2$, $R^3$, $R^4$, $R_5$ or T is optionally substituted alkyl it is preferably optionally substituted $C_{1-20}$-alkyl, more preferably optionally substituted $C_{1-10}$-alkyl and especially optionally substituted $C_{1-6}$-alkyl. Preferred optional substituents include $C_{1-6}$-alkoxy, $C_{1-6}$-hydroxyalkoxy, —OH, —COOH, —SO$_3$H, —PO$_3$H$_2$, —CN, a 5 or 6 membered heterocyclic group and optionally substituted amino. Preferred 5 or 6 membered heterocyclic groups are optionally substituted furanyl, tetrahydrofuranyl, piperazinyl and niorpholinyl.

When any of $R^2$, $R^3$, $R^4$, $R^5$ or T is optionally substituted aryl it is preferably optionally substituted phenyl or naphthyl, more preferably optionally substituted phenyl. Preferred optional substituents are $C_{1-6}$-alkoxy, halo (preferably F or Cl), —OH, —CN, —COOH, —SO$_3$H, —PO$_3$H$_2$, —NO$_2$, —NH$_2$, —COC$_{1-4}$-alkyl, —NHCOC$_{1-4}$-alkyl, —(C$_{1-6}$-alkylene)O(C$_{1-6}$-alkylene)OC$_{1-4}$-alkyl, —(C$_{2-6}$-alkylene)O(C$_{2-6}$-alkylene)OH, $C_{1-6}$-alkyl, —SO$_2$NH$_2$, —SO$_2$NHC$_{1-4}$-alkyl or $C_{1-6}$-alkyl substituted by —OH, —COOH or —SO$_3$H.

When any of $R^2$, $R^3$, $R^4$ or $R^5$ is optionally substituted aralkyl it is preferably of the formula:

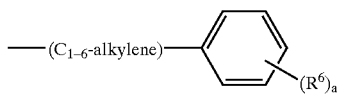

each $R^5$ independently is $C_{1-4}$-alkyl, $C_{1-4}$-alkoxy, halo, —OH, —NH$_2$, —COOH, —SO$_3$H or —PO$_3$H$_2$; and
a is 0 to 5.

a is preferably 0, 1 or 2, more preferably 0 or 1.

When $R^4$ and $R^5$ together with the nitrogen to which they are attached form an optionally substituted 5 or 6 membered ring it is preferably an optionally substituted piperazine, piperidine or morpholine ring. The substituents are preferably selected from —OH, —COOH, —SO$_3$H, $C_{1-6}$-alkoxy, $C_{1-6}$-alkyl and $C_{1-6}$-alkyl substituted by —OH, —COOH or —SO$_3$H.

When Z is a labile atom or group, it is preferably an atom or group which is displaceable by a hydroxyl group of cellulose under mildly alkaline aqueous conditions to form a covalent bond between the dye of Formula (1) and cellulose.

Preferred labile atoms and groups which may be represented by Z include halogen atoms, for example F or Cl; sulphonic acid groups; thiocyano groups; quaternary ammonium groups, for example trialkylammonium groups and optionally substituted pyridinium groups, for example 3- and 4-carboxy pyridinium groups. An especially preferred labile atom is Cl.

It is preferred however that each Z independently is —SR$^2$, —OR$^3$ or —NR$^4$R$^5$, more preferably —OH, —SR$^2$ or —NR$^4$R$^5$ wherein $R^2$, $R^4$ and $R^5$ are as hereinbefore defined. It is especially preferred that each Z independently is —NR$^7$R$^8$ wherein $R^7$ is $C_{1-6}$-alkyl optionally substituted by —OH, $C_{1-4}$-alkoxy, $C_{1-4}$-hydroxyalkoxy, —COOH or —SO$_3$H; and $R^8$ independently is as defined for $R^7$or H.

For ease of synthesis it is preferred that each Z is the same in Formula (1).

L is preferably a branched, monocyclic (for example cyclohexylene) or more preferably linear alkylene group. Preferably L is optionally interrupted $C_{1-20}$-alkylene, wherein the optional interruptions are as hereinbefore defined. More preferably L is $C_{2-20}$-alkylene optionally interrupted by —O—, —S—, —CH=CH— or —NR$^1$— wherein $R^1$ is as hereinbefore defined. It is especially preferred that L is $C_{2-6}$-alkylene, more especially ethylene (i.e. —CH$_2$CH$_2$—).

When L is interrupted it preferably contains a single interrupting group or two or more interrupting groups, for example an —SS— group. Preferred interrupting groups are selected from one or more of —S—, —CH=CH— and —NR$^1$— wherein $R^1$ is as hereinbefore defined.

Examples of optionally substituted alkylene groups represented by L include: ethylene; 1,2- & 1,3-propylene; 2-hydroxy-1,3-propylene 1,4-, 2,3- and 2,4-butylene; 2-methyl-1,3-propylene; 2-methyl-2,4-pentylene; 2,2-dimethyl-1,3-propylene; 1-chloro-2,3-propylene; 1,6- and 1,5-hexylene; 2,7-heptylene; 3-methyl-1,6-hexylene and 1,4-cyclohexylene. Examples of interrupted alkylene groups represented by L include: —CH$_2$NHCH$_2$—; —CH$_2$CH=CHCH$_2$—; —CH$_2$CH$_2$OCH$_2$CH$_2$—; —CH$_2$CH$_2$SSCH$_2$CH$_2$— and —CH$_2$CH$_2$SCH$_2$CH$_2$—.

The floating sulpho groups in Formula (1) are preferably attached meta to the —NR$^1$— group.

In a first preferred embodiment of the present invention, when both groups represented by X in Formula (1) are NH, then L is cyclohexylene or optionally interrupted linear or branched chain alkylene, optionally substituted by halo or —OH, wherein the optional interruption(s) are selected from —S—, —NR$^1$—, —CR$^1$=CR$^1$—, —C(O)— and —C(O)O—, wherein $R^1$ is as hereinbefore defined.

In a second preferred embodiment L in Formula (1) is optionally interrupted linear or branched alkylene, optionally substituted by halo or —OH, wherein the optional interruption(s) are selected from —S—, —NR$^1$—, —CR$^1$=CR$^1$—, —C(O)— and —C(O)O—, wherein $R^1$ is as hereinbefore defined.

In the first and second preferred embodiments L is preferably a linear $C_{2-20}$-alkylene group optionally interrupted by —S—, —CH=CH— or —NR$^1$— wherein $R^1$ is as hereinbefore defined. It is especially preferred that L is $C_{2-6}$-alkylene.

In view of the foregoing preferences, the dye of the Formula (1) used in the compositions of the present invention is preferably of Formula (2) or a salt thereof:

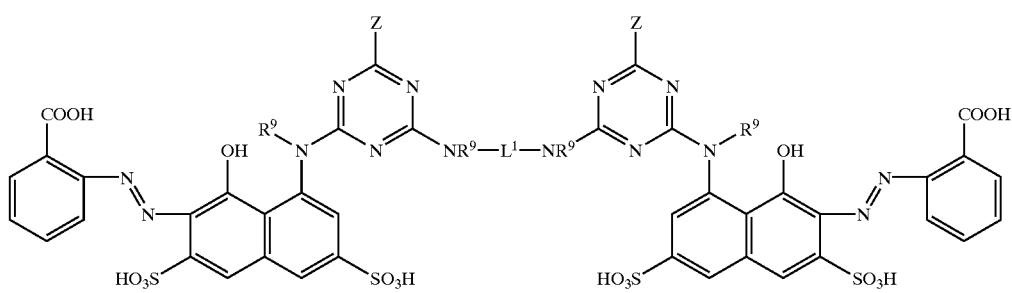

Formula (2)

wherein:

$L^1$ is optionally interrupted $C_{2-20}$-alkylene, wherein the optionally interruption(s) are selected from —O—, —S—, —CR$^9$=CR$^9$— or —NR$^9$—;

each $R^9$ independently is H or $C_{1-4}$-alkyl optionally substituted by —OH, —COOH, —SO$_3$H or —CN; and each Z independently is as hereinbefore defined.

Preferred dyes of the Formula (2) used in the composition are not of the Formula (A), (B), (C) or (D) as hereinbefore defined.

Preferably $L^1$ is optionally interrupted linear or branched $C_{2-20}$-alkylene, wherein the optional interruption(s) are selected from —S—, —CR$^9$=CR$^9$— or —NR$^9$— wherein $R^9$ is as hereinbefore defined. More preferably $L^1$ is a linear $C_{2-20}$-alkylene group. It is especially preferred that $L^1$ is $C_{2-6}$-alkylene.

Each $R^9$ preferably independently is H or $C_{1-4}$-alkyl optionally substituted by —OH, more preferably H.

More preferably in the dyes of Formula (2) the group —NR$^9$L$^1$NR$^9$— is not of the Formula (E), (F), (G), (H), (I) or (J) as hereinbefore defined.

Especially preferred dyes of the Formula (2) are those in which $L^1$ is $C_{2-4}$-alkylene and each Z independently is —NR$^7$R$^8$ wherein $R^7$ and $R^8$ are as hereinbefore defined; more especially those in which $L^1$ is $C_{2-4}$-alkylene, each Z independently is —NR$^7$R$^8$ and each $R^9$ is H.

The dyes of Formula (1) may be in the free acid or salt form. Preferred salts are water-soluble, for example alkali metal salts, especially lithium, sodium and potassium salts, ammonium and substituted ammonium salts. Especially preferred salts are salts with sodium, lithium, ammonia, volatile amines and mixed salts thereof, especially mixed lithium/sodium salts. The dyes may be converted into a salt using known techniques. For example, an alkali metal salt may be converted into a salt with ammonia or an amine by dissolving an alkali metal salt in water, acidifying with a mineral acid and adjusting the pH of the solution to pH 9 to 9.5 with ammonia or the amine and removing the alkali metal cations by dialysis, reverse osmosis or ultrafiltration.

Component (b) of the composition according to the first aspect of the invention may comprise a single dye of Formula (1) or two or more dyes of the Formula (1) as hereinbefore defined.

The composition may also further contain one or more magenta dyes other than a dye of Formula (1). Accordingly, the composition preferably comprises:

(a) from 99.99 to 70, more preferably from 99.9 to 80, especially from 99.5 to 85, and more especially from 99 to 95 parts in total of the liquid medium;

(b) from 0.01 to 30, more preferably 0.1 to 20, especially from 0.5 to 15, and more especially from 1 to 5 parts of one or more dyes of the Formula (1) or salt thereof; and (c) from 0 to 30, more preferably from 0 to 20, especially from 0.01 to 15 parts of a magenta dye other than a dye of Formula (1) or salt thereof;

wherein all parts are by weight and the sum of the parts (a)+(b)+(c)=100.

The liquid medium preferably comprises water or, more preferably, (i), (ii) or (iii), especially when Z is a labile atom or group:

(i) a mixture of water and an organic solvent;

(ii) an organic solvent free from water; or (iii) a low melting point solid.

When the liquid medium is a mixture of water and an organic solvent, or an organic solvent free from water; the dye is preferably completely dissolved in the medium.

Preferably the dye has a solubility in the medium at 20° C. of at least 10%. This allows the preparation of concentrates which may be used to prepare more dilute inks and reduces the chance of the dye(s) precipitating if evaporation of the liquid medium occurs during storage.

When the liquid medium comprises a mixture of water and an organic solvent, the weight ratio of water to organic solvent is preferably from 99:1 to 1:99, more preferably from 99:1 to 50:50 and especially from 95:5 to 80:20.

It is preferred that the organic solvent present in the mixture of water and organic solvent is a water-miscible organic solvent or a mixture of such solvents. Preferred water-miscible organic solvents include $C_{1-6}$-alkanols, preferably methanol, ethanol, n-propanol, isopropanol, n-butanol, sec-butanol, tert-butanol, n-pentanol, cyclopentanol and cyclohexanol; linear amides, preferably dimethylformamide or dimethylacetamide; ketones and ketone-alcohols, preferably acetone, methyl ether ketone, cyclohexanone and diacetone alcohol; water-miscible ethers, preferably tetrahydrofuran and dioxane; diols, preferably diols having from 2 to 12 carbon atoms, for example pentane-1,5-diol, ethylene glycol, propylene glycol, butylene glycol, pentylene glycol, hexylene glycol and thiodiglycol and oligo- and poly-alkyleneglycols, preferably diethylene glycol, triethylene glycol, polyethylene glycol and polypropylene glycol; triols, preferably glycerol and 1,2,6-hexanetriol; mono-$C_{1-4}$-alkyl ethers of diols, preferably mono-$C_{1-4}$-alkyl ethers of diols having 2 to 12 carbon atoms, especially 2-methoxyethanol, 2-butoxyethanol, 2-(2-methoxyethoxy)ethanol, 2-(2-ethoxyethoxy)-ethanol, 2-[2-(2-methoxyethoxy)ethoxy]ethanol, 2-[2-(2-ethoxyethoxy)-ethoxy]-ethanol and ethyleneglycol monoallylether; cyclic amides, preferably 2-pyrrolidone, N-methyl-2-pyrrolidone, N-ethyl-2-pyrrolidone, caprolactam and 1,3-dimethylimidazolidone; cyclic esters, preferably caprolactone; sulphoxides, preferably dimethyl sulphoxide and sulpholane. Preferably the liquid medium comprises water and 2 or more, especially from 2 to 8, water-miscible organic solvents.

Examples of further suitable liquid media comprising a mixture of water and one or more organic solvents are described in U.S. Pat. No. 4,963,189, U.S. Pat. No. 4,703,113, U.S. Pat. No. 4,626,284, EP 425,150A and U.S. Pat. No. 5,207,824.

When the liquid medium comprises an organic solvent free from water, (i.e. less than 1% water by weight) the solvent preferably has a boiling point of from 30° to 200° C., more preferably of from 40° to 150° C., especially from 50 to 125° C. The organic solvent may be water-immiscible, water-miscible or a mixture of such solvents. Preferred water-miscible organic solvents are any of the hereinbefore described water-miscible organic solvents and mixtures thereof. Preferred water-immiscible solvents include, for example, aliphatic, hydrocarbons; esters, preferably ethyl acetate; chlorinated hydrocarbons, preferably $CH_2Cl_2$; and ethers, preferably diethyl ether; and mixtures thereof.

When the liquid medium comprises a water-immiscible organic solvent, preferably a polar solvent is included because this enhances solubility of the dye in the liquid medium. Examples of polar solvents include $C_{1-4}$-alcohols. In view of the foregoing preferences it is especially preferred that where the liquid medium is an organic solvent free from water it comprises a ketone (especially methyl ethyl ketone) &/or an alcohol (especially a $C_{1-4}$-alkanol, such as ethanol or propanol).

The organic solvent free from water may be a single organic solvent or a mixture of two or more organic solvents. It is preferred that when the medium is an organic solvent free from water it is a mixture of 2 to 5 different organic solvents. This allows a medium to be selected which gives good control over the drying characteristics and storage stability of the composition according to the first aspect of the invention.

Liquid media comprising an organic solvent free from water are particularly useful where fast drying times are required and particularly when printing onto hydrophobic and non-absorbent substrates, for example plastics, metal and glass.

Preferred low melting point solids have a melting point in the range from 60° C. to 125° C. Suitable low melting point solids include long chain fatty acids or alcohols, preferably those with $C_{18-24}$ chains, and sulphonamides. The dye may be dissolved in the low melting point solid or may be finely dispersed in it.

The dyes of Formula (1) exhibit a high solubility in aqueous media, accordingly it is preferred that the liquid medium is a mixture of water and one or more water-miscible organic solvent(s).

The composition may also contain additional components conventionally used in ink jet printing inks, for example viscosity and surface tension modifiers, corrosion inhibitors, biocides, kogation reducing additives, anti-cockle agents to reduce paper curling and surfactants which may be ionic or non-ionic.

The pH of the composition is preferably from 4 to 10.

Component (c) of the composition, when present, is preferably a water-soluble magenta dye, more preferably a xanthene dye, an azo dye or a bis azo dye, especially an anionic azo or bis azo dye and more especially an azo or bis azo dye which contains one or more groups selected from sulphonate, carboxylate and thiocarboxylate groups.

Preferred water-soluble magenta dyes for use as component (c) include C.I. Acid Red 50, 52, 87, 91, 92, 95, 249 and 289; C.I. Direct Violet 106 and 107; compounds 100 to 107, 200 and 201 described on pages 8 and 9 of W096/24636; compounds 1 to 24 shown described on cols. 4 to 10 in U.S. Pat. No. 5,542,970; compounds 1 to 55 described on pages 7 to 17 of EP-A-682 088; compounds 1 to 14 shown in Example 1 to 6 of EP-A-194,885; compounds 1 to 24 described on pages 8 to 13 of EP-A-717 089; the compounds described in examples 1 to 16 in cols. 5 to 11 of U.S. Pat. No. 5,262,527; the dyes described in Examples 1 to 21 in WO 94/16021; and one or more dyes of the Formula (3) or salts thereof:

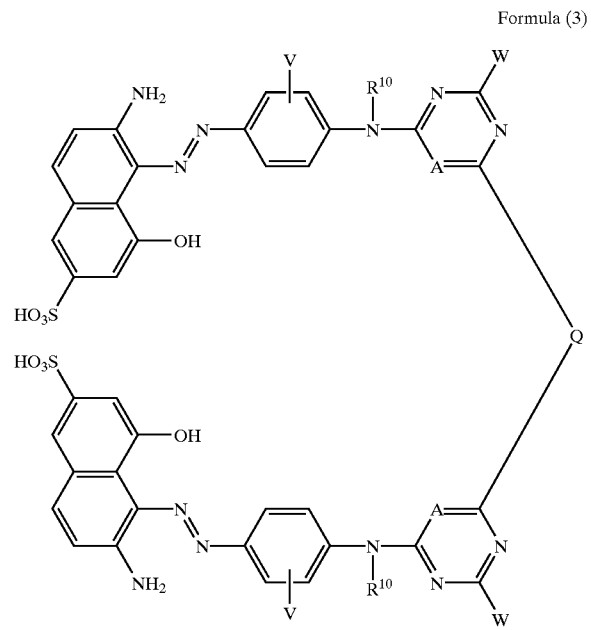

Formula (3)

wherein:

each V independently is —$SO_3H$, —COOH, —$CF_3$, alkoxy, alkyl or —$PO_3H_2$;

Q is an organic linking group;

each $R^{10}$ independently is H or optionally substituted alkyl;

each A independently is N, C—Cl, C—CN or C—$NO_2$;

each W independently is —$SR^{11}$, —$OR^{12}$, —$NR^{13}R^{14}$ or halo;

$R^{11}$, $R^{12}$, $R^{13}$ & $R^{14}$ are, each independently, H, optionally substituted alkyl, optionally substituted aryl or optionally substituted aralkyl; or $R^{13}$ and $R^{14}$ together with the nitrogen to which they are attached, form an optionally substituted five or six membered ring;

Especially preferred water-soluble magenta dyes for use as component (c) include C.I. Acid Red 52, C.I. Acid Red 289 and dyes of the Formula (4), (5) and (6):

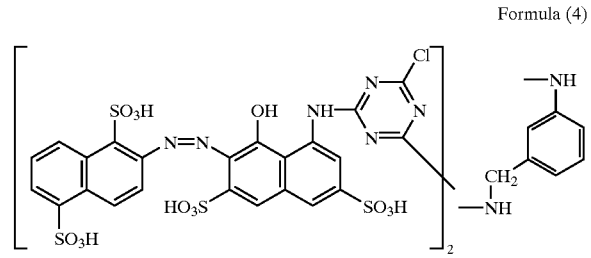

Formula (4)

Formula (5)

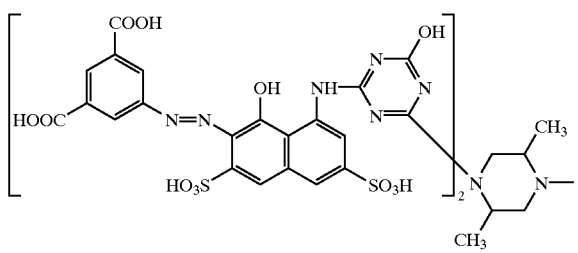

Formula (6)

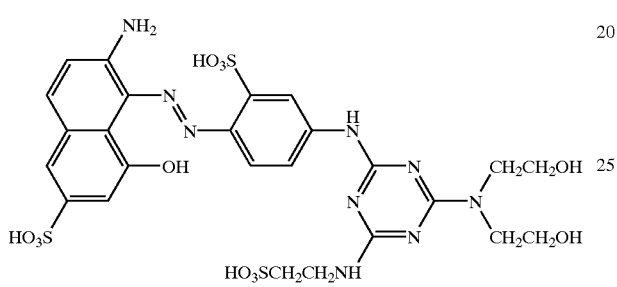

The dye of Formula (4) may be prepared using the method described in Example 1 of EP-A-559 310. The dye of the Formula (5) may be prepared using the method described in Example 3 of WO 94/16021. The dye of Formula (6) may be prepared using to the method described in Example 1 of WO 96/24636.

The composition may be used as a concentrate from which inks are prepared, or it may be an ink per se. Preferably the composition is an ink, more especially an ink suitable for use in thermal or piezo ink jet printers.

When the composition according to the first aspect of the invention is used as an ink jet printing ink, the composition preferably has a concentration of less than 100 parts per million, more preferably less than 50 parts per million, in total of halide ions and divalent and trivalent metals. This reduces nozzle blockage in ink jet printing heads, particularly in thermal ink jet printers. As will be understood, the term "parts per million" refers to parts by weight.

According to a second aspect of the present invention there is provided a dye of the Formula (1) or salt thereof, as hereinbefore defined, with the provisos:

(i) each Z independently is —$SR^2$, —$OR^3$ or —$NR^4R^5$; wherein $R^2$, $R^3$, $R^4$ and $R^5$ are as hereinbefore defined; and (ii) the dye is not a dye of the Formula (A) wherein $X^1$ is Na. Preferably the dye is also not of the Formula (A) wherein $X^1$ is H or of Formula (B), (C) or (D) as hereinbefore defined.

Preferred dyes of the second aspect of the present invention are selected from the preferred dyes of Formula (1) as hereinbefore defined in relation to the compositions according to the first aspect of the present invention. In other words, the preferences described above for the dyes of Formula (1) used in the compositions also apply to the dyes of the second aspect of the present invention.

Especially preferred dyes of the second aspect of the present invention are of the Formula (2) and salts thereof as hereinbefore defined, with the provisos:

(i) each Z independently is —$SR^2$, —$OR^3$ or —$NR^4R^5$ wherein $R^2$, $R^3$, $R^4$ and $R^5$ are as hereinbefore defined; and (ii) the dye of Formula (2) is not a dye of the Formula (A), (B), (C) or (D) as hereinbefore defined.

The dyes of the second aspect of the invention exhibit a high solubility in aqueous media and provide prints which exhibit high light fastness and water fastness when incorporated into inks for ink jet printing.

According to a third aspect of the present invention there is provided a composition comprising:

(i) from 1 to 99 parts, more preferably from 3 to 70 and especially from 5 to 50 parts in total of one or more dye(s) of Formula (1) or salts thereof as hereinbefore defined in the second aspect of the invention; and (ii) from 99 to 1 parts, more preferably from 30 to 97 parts and especially 95 to 50 parts in total of one or more water-soluble magenta dye(s) other than a dye of the Formula (1) or salt thereof;

wherein all parts are by weight and the sum of the parts (i) and (ii)=100.

Preferred dyes of the Formula (1) in component (i) of the composition according to the third aspect of the invention are selected from the preferred dyes of Formula (1) described above in the first aspect of the invention, especially dyes of the Formula (2), and salts thereof.

Preferred water-soluble magenta dyes in component (ii) of the composition are selected from the preferred water-soluble magenta dyes described above in relation to component (c) of the composition according to the first aspect of the invention.

The dyes of Formula (1) and Formula (2) may exist in tautomeric forms other than those shown in this specification, for example the hydrazo tautomer. These tautomers are included within the scope of the present claims. Accordingly the compositions and dyes according to the first, second and third aspects of the invention may comprise tautomers of the dyes of Formula (1) and (2).

The dyes in the composition according to the first aspect of the invention and the dyes and compositions according to the second and third aspects of the present invention may be, and preferably are, purified to remove undesirable impurities before they are incorporated into inks for ink jet printing. Conventional techniques may be employed for purifying the dyes, for example ultrafiltration, reverse osmosis and/or dialysis.

The dyes of Formula (1) may be prepared using conventional techniques for the preparation of azo dyes. For example a suitable method comprises condensing a molar excess of the compound of the formula ZH with the compound of the Formula (7):

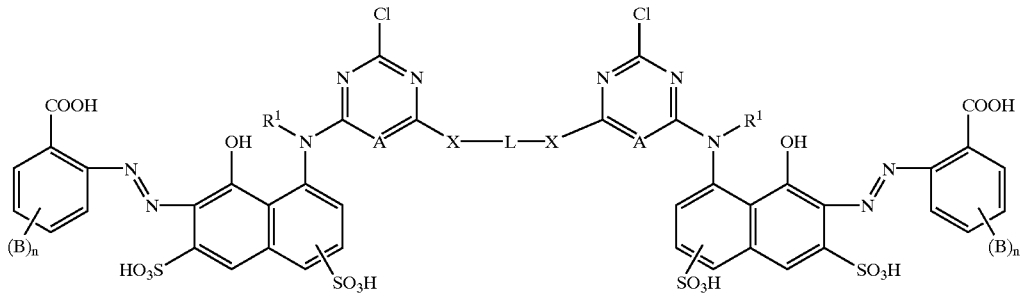

Formula (7)

wherein L and each Z, B, R¹, X, A and n are as hereinbefore defined.

The condensation is preferably performed in a liquid medium, more preferably an aqueous medium and especially water. Temperatures of 10° C. to 100° C. are preferred, more preferably from 20 to 95° C. Preferably a reaction time of 1 to 24, more preferably 1 to 4 hours is used.

The condensation is preferably performed in the presence of a suitable base and optionally with a catalyst, for example 4-dimethylaminopynidine.

The base may be any inorganic base for example, ammonia, an alkali metal or alkali earth metal hydroxide, carbonate or bicarbonate, or an organic base. The amount of base used may be varied between wide limits but it is preferred to use less than 40, more preferably less than 10 and especially from 3 to 5 moles for each mole of the compound of Formula (7).

After the condensation reaction the product may be isolated by precipitating the product as a salt from the reaction mixture for example by the addition of a suitable alkali metal salt, especially sodium chloride. Alternatively, the product may be isolated in its free acid form by acidifying the reaction mixture, preferably using a mineral acid, especially hydrochloric acid. Where the product precipitates as a solid it may be separated from the mixture by filtration.

If desired unwanted anions may be removed from the product of the above process by dialysis, osmosis, ultrafiltration or a combination thereof.

The product of the above process may be converted, if desired, to the $NH_4^+$, quaternary ammonium or organic amine salt by the addition of ammonia, ammonium hydroxide, primary, secondary, tertiary or quaternary amine.

The compound of Formula (7) may, for example, be prepared as follows:

stage (a):
    diazotising the amine of the Formula (8) and coupling with the compound of the Formula (9):

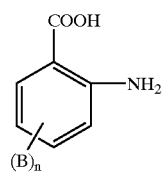

Formula (8)

-continued

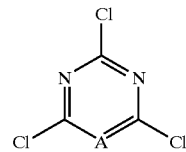

Formula (9)

wherein B, n and R¹ are as hereinbefore defined;

stage (b)
    hydrolysis, under alkaline conditions, of the acetyl group present in the product of stage (a);

stage (c)
    condensing the product of stage (b) with an approximately molar equivalent of the compound of the Formula (10):

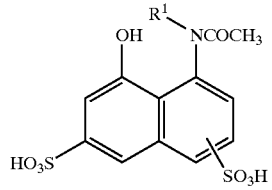

Formula (10)

wherein A is as hereinbefore defined; and stage (d)
    condensing a compound of the formula HX—L—XH with approximately 2 molar equivalents as of the product of stage (c).

The diazotisation in stage (a) is preferably performed in an aqueous medium at a pH below 7 in the presence of a suitable diazotisation agent. Dilute mineral acid, e.g. HCl or $H_2SO_4$, is preferably used to achieve the desired acidic conditions. Conveniently the diazotisation agent is formed in-situ, for example by dissolving an alkali metal nitrite, preferably sodium nitrite, in a molar excess of mineral acid, preferably HCl.

The temperature of the diazotisation is not critical and may conveniently be carried out at from −5° C. to 20° C., preferably from 0 to 10° C. and especially from 0 to 5° C.

The coupling reaction in stage (a) is preferably performed under mildly alkaline conditions, more preferably at a pH of 7–8.

The hydrolysis in stage (b) is preferably performed in aqueous NaOH at a reaction temperature of 50 to 90° C.

The condensations in stages (c) and (d) are preferably performed in the presence of a base.

A fourth aspect of the present invention provides a process for printing an image on a substrate comprising applying thereto by means of a ink jet printer an ink containing a dye of the Formula (1) or a salt thereof as defined in the first aspect of the invention or a composition according to the third aspect of the present invention.

The ink jet printer preferably applies the ink to the substrate in the form of droplets which are ejected through a small orifice onto the substrate. Preferred ink jet printers are piezoelectric ink jet printers and thermal ink jet printers. In thermal ink jet printers, programmed pulses of heat are applied to the ink in a reservoir by means of a resistor adjacent to the orifice, thereby causing the ink to be ejected in the form of small droplets directed towards the substrate during relative movement between the substrate and the orifice. In piezoelectric ink jet printers the oscillation of a small crystal causes ejection of the ink from the orifice.

The substrate is preferably paper, plastic, a textile, metal or glass, more preferably paper, an overhead projector slide or a textile material, especially paper.

Preferred papers are plain or treated papers which may have an acid, alkaline or neutral character. Examples of commercially available papers include, HP Premium Coated Paper, HP Photopaper (all available from Hewlett Packard Inc), Stylus Pro 720 dpi Coated Paper, Epson Photo Quality Glossy Film, Epson Photo Quality Glossy Paper (available from Seiko Epson Corp.), Canon HR 101 High Resolution Paper, Canon GP 201 Glossy Paper, Canon HG 101 High Gloss Film (all available from Canon Inc.), Wiggins Conqueror paper (available from Wiggins Teape Ltd), Xerox Acid Paper and Xerox Alkaline paper, Xerox Acid Paper (available from Xerox).

A fifth aspect of the present invention provides a substrate, preferably a paper, an overhead projector slide or a textile material, printed with a composition according to the first aspect of the present invention or by means of the process according to the fourth aspect of the present invention.

When the substrate is a textile material the ink according to the invention is preferably applied thereto by:
  i) applying the ink to the textile material using an ink jet printer; and
  ii) heating the printed textile material at a temperature of from 50° C. to 250° C.

Preferred textile materials are natural, synthetic and semi-synthetic materials. Examples of preferred natural textile materials include wool, silk, hair and cellulosic materials, particularly cotton, jute, hemp, flax and linen. Examples of preferred synthetic and semi-synthetic materials include polyamides, polyesters, polyacrylonitriles and polyurethanes.

The textile material is preferably pre-treated with an aqueous pre-treatment composition comprising a thickening agent and optionally a water-soluble base and a hydrotropic agent and dried prior to applying the ink. The pre-treatment composition preferably comprises a solution of the base and the hydrotropic agent in water containing the thickening agent. Particularly preferred pre-treatment compositions are described in EP 534,660A.

According to a sixth aspect of the present invention there is provided an ink jet printer cartridge comprising a chamber and ink, wherein the ink is present in the chamber and the ink comprises a composition according to the first aspect of the invention or a composition according to the third aspect of the invention.

According to a seventh aspect of the present invention there is provided an ink jet printer containing an ink jet printer cartridge, wherein the ink jet printer cartridge is as defined in the sixth aspect of the present invention.

The invention is further illustrated by the following Examples in which all parts and percentages are by weight unless otherwise stated.

EXAMPLE 1

Dye (1)

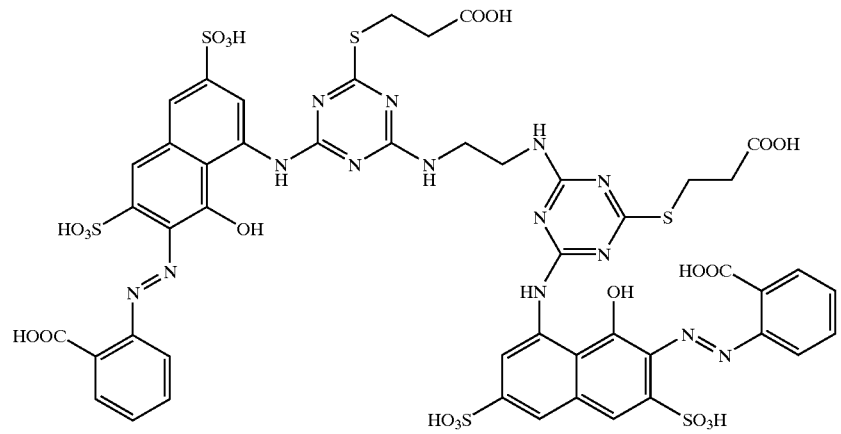

Dye (1)

Dye 1 was Prepared in Accordance with Following Process

Stage (a): Diazotisation and Coupling

Anthranilic acid (13.7 g, 0.1M) was dissolved in 500 ml water at pH 8 (2M NaOH), screened then added sodium nitrite (8.28 g, 0.1 2M). Concentrated hydrochloric acid (30 ml) in ice and water (100 ml) at <5° C. was to this solution at <5° C. over 20 minutes. The mixture was then stirred for 2 hours at <5° C. and excess nitrous acid was destroyed using sulphamic acid.

Acetyl H-acid (51.8 g, 0.1M) was dissolved in 500 ml water, screened then allowed to stir at <5° C. while the above solution was added slowly over 30 minutes whilst maintaining the pH 7–8 with 2M NaOH and the temperature <5° C. The mixture was left to stir for 2 hours at <5° C. and pH 7–8, then the product was salted out using 20% w/v NaCl. The precipitate was filtered off and washed well with saturated brine then pulled dry on a filter.

Stage (b): Hydrolysis

The product of stage (a) was hydrolysed in 1 litre of water and 170 ml concentrated sodium hydroxide at 80° C. for 4 hours. The solution was then neutralised while hot to pH 8 using concentrated hydrochloric acid. The product was salted out by addition of 20% w/v NaCl, filtered off and washed well with saturated brine, pulled dry on a filter and then dried in the oven at 50° C.

Stage (c): Condensation with Cyanuric Chloride

The product of stage (b) (60 g, 0.087M) was stirred in 1 litre of water adjusted to pH 8.5 using 2M NaOH. The resulting suspension was cooled to <5° C. then cyanuric chloride (17.64 g, 0.096M dispersed in 50 ml water with calsolene oil) was added and the reaction mixture was left to stir at <5° C. for 2 hours maintaining pH 6.5 by the addition of 2M NaOH.

Stage (d): Condensation with Ethylenediamine

Ethylenediamine (2.87 g, 0.048M) was added to the product of stage (c) which raised the pH to 10.2. The pH was then maintained at pH 8.5 (using 2 m NaOH) overnight while allowing the reaction mixture to warm to room temperature. The resulting product had a thick jelly like consistency and was not isolated (2 litres).

Stage (e): Condensation with Mercaptopropionic Acid 500 ml of the product from stage (d) (0.0217M) was stirred then 3-mercaptopropionic acid (13.84 g, 0.13M) was added all at once followed by a spatula end of 4-dimethylaminopyridine (catalyst). The pH was raised to 9.7 using 2M NaOH, then the solution was heated at 90° C. whilst maintaining the pH at 9.7 using 2M NaOH for 1 hour.

The product was salted to 20% w/v with NaCl then precipitated out by lowering pH down to 5 with concentrated hydrochloric acid. The precipitate was filtered off then washed well with meths 740 p. The title product was re-dissolved in 300 ml water using 2M NaOH, then dialysed using Viking tubing to <50ms/cm. The solution was filtered through 6f/f filter paper then dried in an oven at 50° C.

EXAMPLE 2

Dyes (2) to (15)

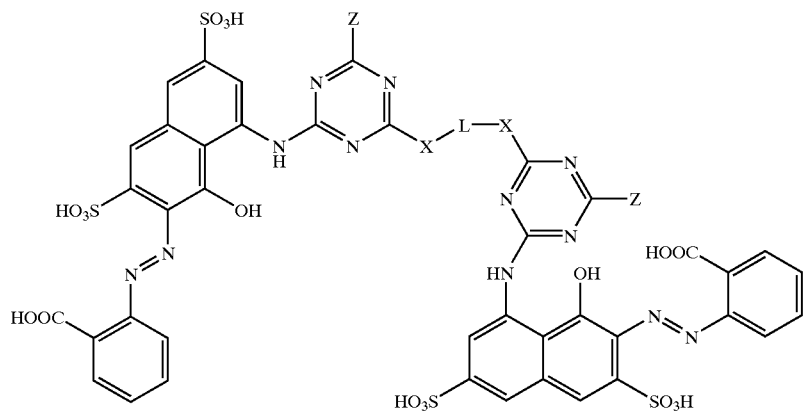

Formula (B)

Dyes (2) to (15) of the Formula (B) were prepared by condensing the compound of the formula HX—L—XH shown in Table 1 with approximately 2 molar equivalents of the product of stage (c) in Example 1. The resulting product was then condensed with the compound of the formula ZH shown in Table 1. The condensations were performed under analogous conditions to those used in stages (d) and (e) of Example 1

TABLE 1

| Dye | HX—L—XH | ZH |
|---|---|---|
| Dye (2) | $NH_2(CH_2)_3NH_2$ | $HO(CH_2)_2O(CH_2)_2NH_2$ |
| Dye (3) | $NH_2(CH_2)_3NH_2$ | $HO(CH_2)_2NH_2$ |
| Dye (4) | $NH_2(CH_2)_2NH_2$ | $HO(CH_2)_2NH_2$ |
| Dye (5) | $NH_2(CH_2)_2NH_2$ | $HO(CH_2)_2O(CH_2)_2NH_2$ |
| Dye (6) | $NH_2(CH_2)_2NH_2$ | $HN(CH_2CH_2OH)_2$ |
| Dye (7) | $NH_2(CH_2)_3NH_2$ | $HN(CH_2CH_2OH)_2$ |
| Dye (8) | $NH_2(CH_2)_3NH_2$ | $HS(CH_2)_2COOH$ |
| Dye (9) | 1,4-diaminocyclohexane | $HN(CH_2)_2O(CH_2)_2OH$ |
| Dye (10) | 1,4-diaminocyclohexane | $HS(CH_2)_2COOH$ |
| Dye (11) | $NH_2(CH_2)_2NH_2$ | $H_2S$ |
| Dye (12) | $NH_2(CH_2)_2NH_2$ | $HN(CH_3)(CH_2)_2SO_3H$ |
| Dye (13) | $NH_2(CH_2)_2NH_2$ | $HNCH_2CH(OH)CH_2OH$ |
| Dye (14) | $NH_2(CH_2)_2SH$ | $NH_3$ |
| Dye (15) | $NH_2(CH_2)_2SH$ | $HN(CH_2)_2CH(OH)CH_2OH$ |

EXAMPLE 3

Dyes (16) and (26) of the Formula (C):

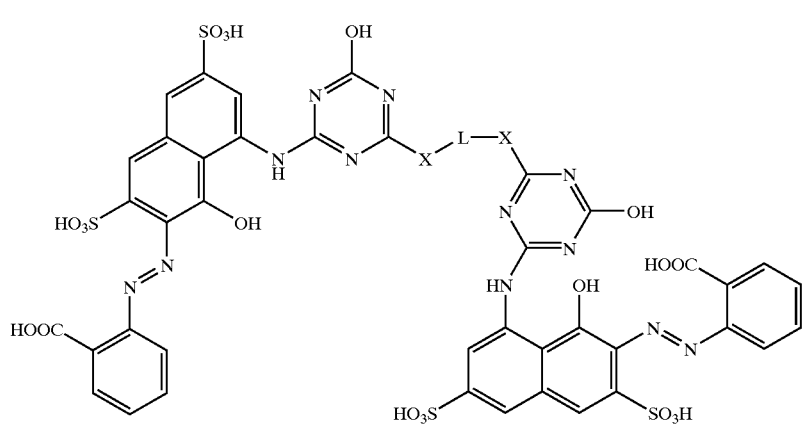

Formula (C)

Dyes (16) and (26) were prepared by condensing the compound of the formula HXL—XH shown in Table 2 with approximately 2 molar equivalents of the product of stage (c) in Example 1. The resulting product was then hydrolysed by heating in aqueous sodium hydroxide to give the title product.

TABLE 2

| Dye | HX—L—XH |
| --- | --- |
| Dye (16) | $NH_2(CH_2)_2NH_2$ |
| Dye (17) | $NH_2(CH_2)_3NH_2$ |
| Dye (18) | 1,4-diaminocyclohexane |
| Dye (19) | $NH_2(CH_2)_5NH_2$ |
| Dye (20) | $SH(CH_2)_2SH$ |
| Dye (21) | $SH(CH_2)_2O(CH_2)_2O(CH_2)_2SH$ |

TABLE 2-continued

| Dye | HX—L—XH |
| --- | --- |
| Dye (22) | $NH_2CH_2CH(OH)CH_2NH_2$ |
| Dye (23) | $NH_2(CH_2)_2S_2(CH_2)_2NH_2$ |
| Dye (24) | $NH_2(CH_2)_7NH_2$ |
| Dye (25) | $NH_2(CH_2)_9NH_2$ |

EXAMPLE 4

Dye (26)

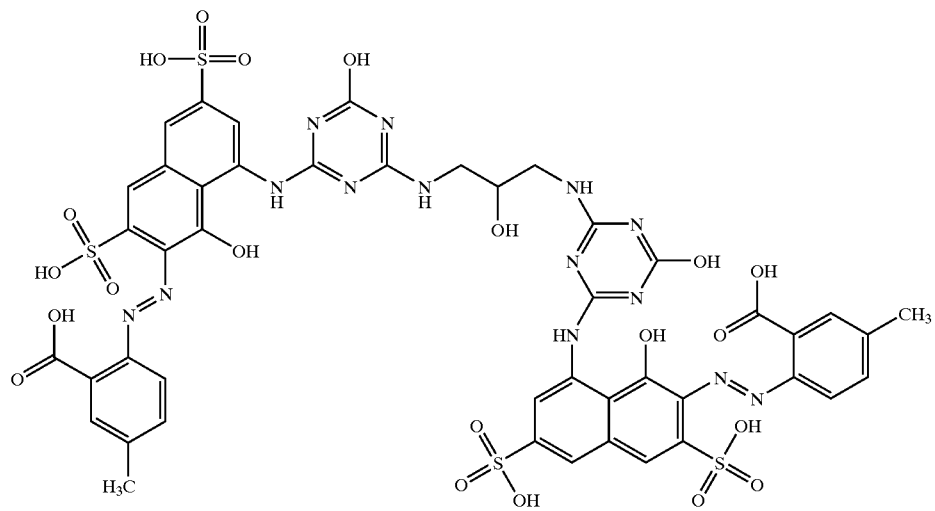

Dye (26)

Dye (26) was prepared using an analogous method to that described in Example 1, except that the anthranilic acid used in stage (a) was replaced with -2-amino,5-methylbenzoic acid; in place of the ethylenediamine used in stage (d) was used 1,3-diamino-2-hydroxypropane; and the product of stage (d) was hydrolysed by heating in aqueous sodium hydroxide to give the title product.

EXAMPLE 5

Inks and Ink Jet Printing

The dyes described in Examples 1 to 4 may be formulated into inks by dissolving the dye(s) in a suitable ink medium and filtering the solution through a 0.45 μm filter. For example a suitable ink consists of 3.5 parts dye in 96.5 parts of a medium consisting of:

5 parts 2-pyrrolidone;

5 parts thiodiglycol;

2 parts Surfynol 465 (a non-ionic surfactant available from Air Products Inc.); and 88 parts water.

When ink jet printed onto paper, the inks provide prints which are a bright magenta shade with a high water-fastness, good light fastness and a high optical density.

EXAMPLE 6

The inks described in Tables 3, 4 and 5 may be prepared wherein the Dye described in the first column is the Dye made in the above Examples 1 to 4. Numbers quoted in the second column onwards refer to the number of parts of the relevant ingredient and all parts are by weight. The inks may be applied to paper by thermal or piezo ink jet printing.

The following abbreviations are used in Tables 3, 4, and 5:

| | |
|---|---|
| PG | = propylene glycol |
| NMP | = N-methyl pyrrolidone |
| CYC | = cyclohexanol |
| P12 | = propane-1,2-diol |
| CET | = cetyl ammonium bromide |
| TBT | = tertiary butanol |
| GLY | = glycerol |
| PEG 200 | = Polyethylene glycol (average molecular weight of 200) |
| H-1,6 | = Hexane 1,6-diol |
| CAP-L | = caprolactam |
| DEG-MBE | = diethylene glycol monobutyl ether |
| EG | = ethylene glycol |
| DEG | = diethylene glycol |
| TFP | = 2,2,3,3-tetrafluoropropanol |
| 2P | = 2-pyrrolidone |
| UR | = Urea |
| PHO | = $Na_2HPO_4$ and |
| TDG | = thiodiglycol |
| P-1,5 | = Pentane-1,5-diol |
| CAP | = caprolactone |
| TEA | = triethanolamine |
| BUT | = γ-butyrolactone |

TABLE 3

| Ink | Dye | Dye Content | Water | PG | DEG | NMP | P-1,5 | TEA | CYC | BUT | CAP | EG | CAP-L |
|---|---|---|---|---|---|---|---|---|---|---|---|---|---|
| 1 | 1 | 3.0 | 90 | | 5 | | 4.8 | 0.2 | | | | | |
| 2 | 2 | 10.0 | 85 | 3 | | 3 | 3 | | | 5 | | | |
| 3 | 2 | 2.1 | 91 | | 8 | | | | | | | 1 | 1 |
| 4 | 3 | 3.1 | 86 | 5 | | | | | 0.2 | 4 | | | 4.8 |
| 5 | 4 | 1.1 | 81 | | | 9 | | 0.5 | 0.5 | | | | |
| 6 | 5 | 2.5 | 60 | 4 | 15 | 3 | 3 | | | 6 | | 9 | 4 |
| 7 | 6 | 5 | 65 | | 20 | | 5 | | | 10 | | 5 | |
| 8 | 6 | 2.4 | 75 | 5 | 4 | | 5 | | | | 6 | | 5 |
| 9 | 10 | 4.1 | 80 | 3 | 5 | 2 | 9.7 | | 0.3 | | | | |
| 10 | 7 | 3.2 | 65 | | 5 | 4 | 6 | | | 5 | 4 | | 5 |
| 11 | 8 | 5.1 | 96 | | | | | | | | 4 | 6 | |
| 12 | 9 | 10.8 | 90 | 5 | | | | | | 5 | | | |
| 13 | 10 | 10.0 | 80 | 2 | | 6 | 2 | 5 | | 1 | | | |
| 14 | 9 | 1.8 | 80 | | 5 | | | | | | | 4 | |
| 15 | 6 | 2.6 | 84 | | | 11 | | | | | | 15 | |
| 16 | 5 | 3.3 | 80 | 2 | | | 10 | | | 2 | 5 | 6 | |
| 17 | 5 | 12.0 | 90 | | | | 7 | 0.3 | | 2.7 | | | |
| 18 | 6 | 5.4 | 69 | 2 | 20 | 2 | 1 | | | | | 3 | 3 |

TABLE 4

| Ink | Dye | Dye Content | Water | GLY | DEG | NMP | CET | TBT | TDG | UR | PHO | 2P | P12 |
|---|---|---|---|---|---|---|---|---|---|---|---|---|---|
| 19 | 1 | 3.0 | 80 | 15 | | | 0.2 | | | | | 4.8 | |
| 20 | 2 | 9.0 | 90 | | 5 | | | | | | | 1.2 | 5 |
| 21 | 3 | 1.5 | 85 | 3.8 | 5 | | 0.16 | 4.64 | 0.2 | | | | |
| 22 | 4 | 2.5 | 90 | | 6 | 3.88 | | | | | 0.12 | | |
| 23 | 5 | 3.1 | 82 | 4 | 8 | | 0.3 | | | | | | 5.7 |
| 24 | 6 | 0.9 | 85 | | 10 | | | | | 4.8 | 0.2 | | |
| 25 | 7 | 8.0 | 90 | | 4.7 | 5 | | | 0.3 | | | | |
| 26 | 8 | 4.0 | 70 | | 10 | 4 | | | | 1 | | 4 | 11 |
| 27 | 9 | 2.2 | 75 | 4 | 10 | 3 | | | | 2 | | 6 | |
| 28 | 10 | 10.0 | 91 | | | 6 | | | | | | 3 | |
| 29 | 7 | 9.0 | 76 | | 9 | 7 | | 2.05 | | | 0.95 | 5 | |
| 30 | 8 | 5.0 | 78 | 5 | 11 | | | | | | | 6 | |
| 31 | 6 | 5.4 | 86 | | | 7 | | | | | | 7 | |
| 32 | 8 | 2.1 | 70 | 5 | 5 | 5 | 0.1 | 0.2 | 0.1 | 5 | 0.1 | 9.5 | |
| 33 | 3 | 2.0 | 90 | | 10 | | | | | | | | |
| 34 | 2 | 2 | 88 | | | 2 | | | 10 | | | | |

TABLE 4-continued

| Ink | Dye | Dye Content | Water | GLY | DEG | NMP | CET | TBT | TDG | UR | PHO | 2P | Pl2 |
|---|---|---|---|---|---|---|---|---|---|---|---|---|---|
| 35 | 4 | 5 | 78 | | | 5 | | | 12 | | | 5 | |
| 36 | 2 | 8 | 70 | 2 | | 8 | | | 15 | | | 5 | |
| 37 | 1 | 10 | 80 | | | | | | 8 | | | 12 | |
| 38 | 9 | 10 | 80 | | 10 | | | | | | | | |

TABLE 5

| Ink | Dye | Dye Content | Water | PEG-200 | DEG-MBE | NMP | H-1,6 | TEA | TFP | BUT | CAP | EG | CAP-L |
|---|---|---|---|---|---|---|---|---|---|---|---|---|---|
| 39 | 1 | 2.0 | 80 | 5 | | 6 | 4 | | | | | 5 | |
| 40 | 2 | 3.0 | 90 | | 5 | 4.8 | | 0.2 | | | | | |
| 41 | 3 | 10.0 | 85 | 3 | | 3 | 3 | | | 5 | | 1 | |
| 42 | 4 | 2.1 | 91 | | 8 | | | | | | | | 1 |
| 43 | 6 | 3.1 | 86 | 5 | | | | | 0.2 | 3.8 | | | 5 |
| 44 | 8 | 1.1 | 81 | | | 9 | | 0.5 | 0.5 | | | 9 | |
| 45 | 9 | 2.5 | 60 | 4 | 15 | 3 | 3 | | | 6 | | 5 | 4 |
| 46 | 10 | 5 | 65 | | 20 | | | | | 10 | | | |
| 47 | 6 | 2.4 | 75 | 5 | 4 | | 5 | | | | 6 | | 5 |
| 48 | 7 | 4.1 | 80 | 3 | 5 | 2 | 9.7 | | 0.3 | | | | |
| 49 | 8 | 3.2 | 70 | | 5 | 4 | 6 | | | 5 | 4 | 6 | 5 |
| 50 | 8 | 5.1 | 96 | | | | | | | | 4 | | |
| 51 | 1 | 10.8 | 90 | 5 | | | | | | 5 | | | |
| 52 | 2 | 10.0 | 80 | 2 | 6 | 2 | 5 | | | 1 | | 4 | |
| 53 | 3 | 1.8 | 80 | | 5 | | | | | | | 15 | |
| 54 | 4 | 2.6 | 84 | | | 11 | | | | | | 5 | |
| 55 | 5 | 3.3 | 80 | 2 | | | 10 | | | | 2 | | 6 |
| 56 | 6 | 12.0 | 90 | | | | 7 | 0.3 | | 2.8 | | | |
| 57 | 7 | 5.4 | 69 | 2 | 20 | 2 | 1 | | | | | 3 | 3 |
| 58 | 8 | 6.0 | 91 | | | | 4 | | | | | 5 | |

What is claimed is:

1. A composition comprising:

(a) a liquid medium comprising (i), (ii) or (iii):

(i) a mixture of water and an organic solvent;

(ii) an organic solvent free from water; or (iii) a low melting point solid; and (b) a dye of the Formula (1) or salt thereof:

Formula (1)

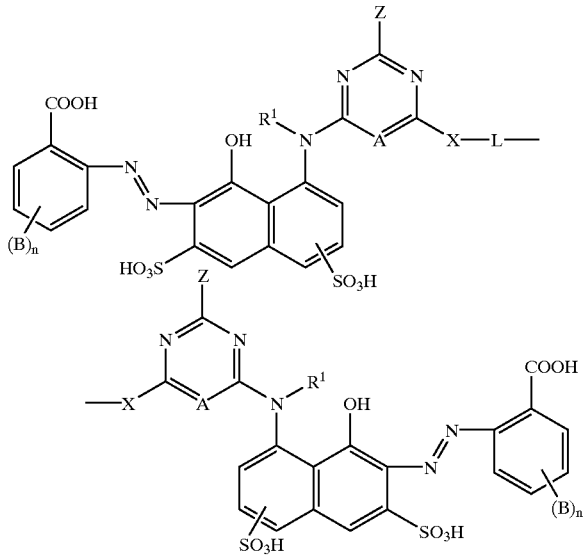

wherein:

each A independently is N, C—Cl, C—CN or C—$NO_2$;

each B independently is a substituent other than —COOH;

L is optionally interrupted alkylene, optionally substituted by halo or —OH, wherein the optional interruption(s) are selected from the group consisting of —S—, —$NR^1$—, —$CR^1$=$CR^1$—, —C(O)— and —C(O)O—;

each Z independently is —$SR^2$, —$OR^3$, —$NR^4R^5$ or a labile atom or group;

each X independently is —S—, —O— or —$NR^1$—;

each $R^1$ independently is H or optionally substituted alkyl;

$R^2$, $R^3$, $R^4$ and $R^5$ are each independently H, optionally substituted alkyl, optionally substituted aryl or optionally substituted aralkyl; or $R^4$ and $R^5$ together with the nitrogen to which they are attached form an optionally substituted five or six membered ring; and each n independently is 0 to 4.

2. A composition according to claim 1 which has a concentration of less than 100 parts per million in total of halide ions and divalent and trivalent metals ions.

3. A composition according to claim 1 wherein L is $C_{2-6}$-alkylene.

4. A composition according to claim 1 wherein each B independently is —$SO_3H$, —$PO_3H_2$, —$CF_3$, optionally substituted alkoxy, optionally substituted alkyl, optionally substituted amino, halo, —CN, —$SO_2$—T, —OH or —$NO_2$, wherein T is optionally substituted alkyl, optionally substituted aryl, vinyl, or a group convertible to vinyl on treatment with aqueous alkali.

5. A composition according to claim 1 wherein each Z independently is —$SR^2$, —$OR^3$ or —$NR^4R^5$ wherein $R^2$, $R^3$, $R^4$ and $R^5$ are each independently H, optionally substituted alkyl, optionally substituted aryl or optionally substituted aralkyl; or $R^4$ and $R^5$ together with the nitrogen to which they are attached form an optionally substituted five or six membered ring.

6. A composition according to claim 1 wherein L is $C_{2-6}$-alkylene optionally interrupted by —S—, —CH=CH— or —$NR^1$— wherein $R^1$ is H or optionally substituted alkyl.

7. A composition according to claim 1 wherein the dye of Formula (1) is of Formula (2) or a salt thereof:

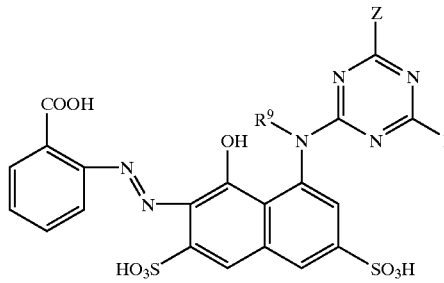
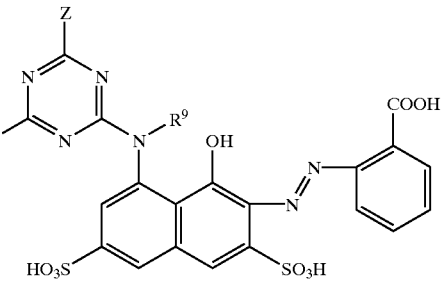

wherein:

$L^1$ is optionally interrupted $C_{2-20}$-alkylene, wherein the optional interruption(s) are selected from the group is consisting of [—O—,] —S—, —CR$^9$=CR$^9$— and —NR$^9$—;

each $R^9$ independently is H or $C_{1-4}$-alkyl optionally substituted by —OH, —COOH, —SO$_3$H or —CN; and each Z independently is SR$^2$, —OR$^3$, —NR$^4$R$^5$ or a labile atom or group wherein R$^2$, R$^3$, R$^4$ and R$^5$ are each independently H, optionally substituted alkyl, optionally substituted aryl or optionally substituted aralkyl; or R$^4$ and R$^5$ together with the nitrogen to which they are attached form an optionally substituted five or six membered ring.

8. A composition according to claim 7 wherein $L^1$ is $C_{2-6}$-alkylene.

9. A composition according to claim 1 which further contains one or more magenta dye(s) other than a dye of Formula (1) or a salt thereof.

10. A composition according to claim 1 which is an ink.

11. A dye of the Formula (1) or salt thereof:

Formula (1)

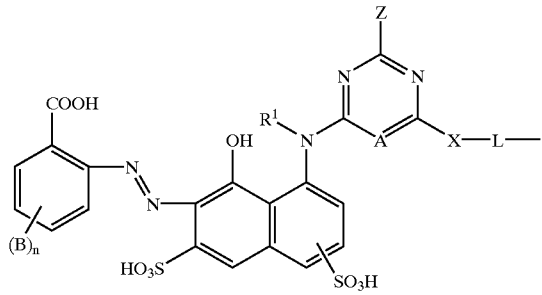

-continued

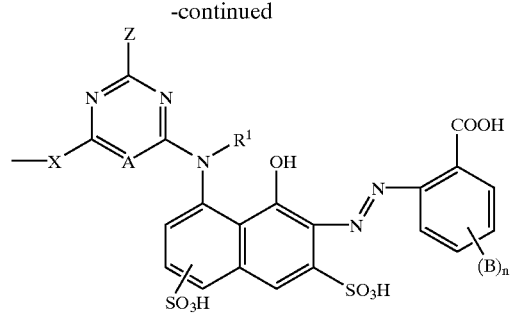

wherein:
each A independently is N, C—Cl, C—CN or C—NO$_2$;
each B independently is a substituent other than —COOH;
L is optionally interrupted $C_{2-6}$-alkylene, optionally substituted by halo or —OH, wherein the optional interruption(s) are selected from the group consisting of —S—, —NR$^1$—, —CR$^1$=CR$^1$—, —C(O)— and —C(O)O—;
each Z independently is —SR$^2$, —OR$^3$ or —NR$^4$R$^5$; and
each X independently is —S—, —O— or —NR$^1$—;
each R$^1$ independently is H or optionally substituted alkyl;
R$^2$, R$^3$, R$^4$ and R$^5$ are each independently H, optionally substituted alkyl, optionally substituted aryl or optionally substituted aralkyl; or
R$^4$ and R$^5$ together with the nitrogen to which they are attached form an optionally substituted five or six membered ring; and
each n independently is 0 to 4.

12. A dye according to either claim 11 wherein:
each B independently is —SO$_3$H, —PO$_3$H$_2$, —CF$_3$, optionally substituted alkoxy, optionally substituted alkyl, optionally substituted amino, halo, —CN, —SO$_2$—T, —OH or —NO$_2$; and
T is optionally substituted alkyl, optionally substituted aryl, vinyl, or a group convertible to vinyl on treatment with aqueous alkali.

13. A dye of the Formula (2) or salt thereof:

Formula (2)

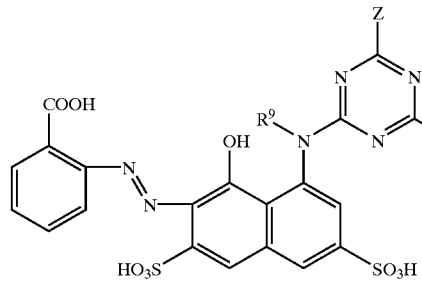
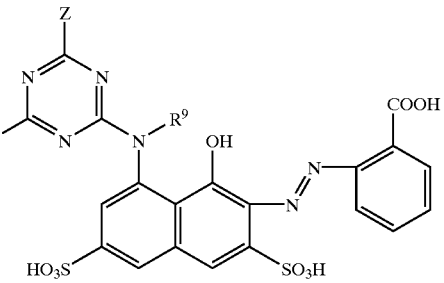

wherein:

L¹ is optionally interrupted $C_{2-6}$-alkylene, wherein the optional interruption(s) are selected from the group consisting of —S—, —CR⁹═CR⁹— or —NR⁹—;

each R⁹ independently is H or $C_{1-4}$-alkyl optionally substituted by —OH, —COOH, —SO₃H or —CN;

each Z independently is —SR², —OR³, —NR⁴R⁵ or a labile atom or group;

R², R³, R⁴ and R⁵ are each independently H, optionally substituted alkyl, optionally substituted aryl or optionally substituted aralkyl; or R⁴ and R⁵ together with the nitrogen to which they are attached form an optionally substituted five or six membered ring.

14. A dye according to claim 13 wherein:

L¹ is $C_{2-4}$-alkylene;

each Z independently is —NR⁷R⁸;

R⁷ is $C_{1-6}$-alkyl optionally substituted by —OH, $C_{1-4}$-alkoxy, $C_{1-4}$-hydroxyalkoxy, —COOH or —SO₃H; and R⁸ independently is as defined for R⁷ or H.

15. A composition comprising:

(i) from 1 to 99 parts in total of one or more dye(s) of the Formula (1) or salts thereof; and (ii) from 99 to 1 parts in total of one or more water-soluble magenta dye(s) other than a dye of the Formula (1) or salt thereof;

each B independently is a substituent other than —COOH;

L is optionally interrupted $C_{2-6}$-alkylene, optionally substituted by halo or —OH, wherein the optional interruption(s) are selected from the group consisting of [—O—,] —S—, —NR¹—, —CR¹═CR¹—, —C(O)— and —C(O)O—;

each Z independently is —SR², —OR³, —NR⁴R⁵ or a labile atom or group;

each X independently is —S—, —O— or —NR¹—;

each R¹ independently is H or optionally substituted alkyl;

R², R³, R⁴ and R⁵ are each independently H, optionally substituted alkyl, optionally substituted aryl or optionally substituted aralkyl; or R⁴ and R⁵ together with the nitrogen to which they are attached form an optionally substituted five or six membered ring; and each n independently is 0 to 4;

wherein all parts are by weight and the sum of the parts (i) and (ii)=100.

16. A process for printing an image on a substrate comprising applying thereto by means of an ink jet printer (i) an ink containing a dye of Formula (1) or a salt thereof:

Formula (1)

Formula (1)

Formula (1)

wherein:

each A independently is N, C—Cl, C—CN or C—NO₂;

each B independently is a substituent other than —COOH;

L is optionally interrupted $C_{2-6}$-alkylene, optionally substituted by halo or —OH, wherein the optional interruption(s) are selected from the group consisting of —S—, —NR$^1$—, —CR$^1$=CR$^1$—, —C(O)— and —C(O)O—;

each Z independently is —SR$^2$, —OR$^3$, —NR$^4$R$^5$ or a labile atom or group;

each X independently is —S—, —O— or —NR$^1$—;

each R$^1$ independently is H or optionally substituted alkyl;

R$^2$, R$^3$, R$^4$ and R$^5$ are each independently H, optionally substituted alkyl, optionally substituted aryl or optionally substituted aralkyl; or R$^4$ and R$^5$ together with the nitrogen to which they are attached form an optionally substituted five or six membered ring; and each n independently is 0 to 4, or (ii) a composition according to claim 15, by means of an ink jet printer.

17. A substrate printed with a composition according to claim 1.

18. An ink jet printer cartridge comprising a chamber and ink, wherein the ink is present in the chamber and the ink comprises a composition according to claim 1.

19. An ink jet printer containing an ink jet printer cartridge, wherein the ink jet printer cartridge is as defined in claim 18.

20. A substrate printed by a process comprising applying thereto by means of an ink jet printer an ink containing a dye of Formula (1) or a salt thereof:

Formula (1)

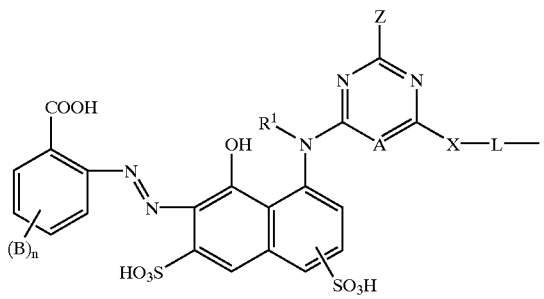

wherein:

each A independently is N, C—Cl, C—CN or C—NO$_2$;

each B independently is a substituent other than —COOH;

L is optionally interrupted C$_{2-6}$-alkylene, optionally substituted by halo or —OH, wherein the optional interruption(s) are selected from the group consisting of —S—, —NR$^1$—, —CR$^1$=CR$^1$—, —C(O)— and —C(O)O—;

each Z independently is —SR$^2$, —OR$^3$, —NR$^4$R$^5$ or a labile atom or group;

each X independently is —S—, —O— or —NR$^1$—;

each R$^1$ independently is H or optionally substituted alkyl;

R$^2$, R$^3$, R$^4$ and R$^5$ are each independently H, optionally substituted alkyl, optionally substituted aryl or optionally substituted aralkyl; or R$^4$ and R$^5$ together with the nitrogen to which they are attached form an optionally substituted five or six membered ring; and each n independently is 0 to 4.

21. A substrate according to claim 20, wherein said ink comprises a composition comprising:

(i) from 1 to 99 parts in total of one or more dye(s) of the Formula (1) or salts thereof as defined above; and (ii) from 99 to 1 parts in total of one or more water-soluble magenta dye(s) other than a dye of the Formula (1) or salt thereof as defined above; wherein all parts are by weight and the sum of the parts (i) and (ii)=100 by means of an ink jet printer.

22. An ink jet printer cartridge comprising a chamber and ink, wherein the ink is present in the chamber and the ink comprises a composition according to claim 15.

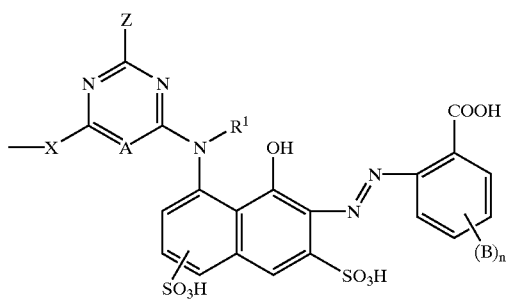

23. An ink jet printer containing an ink jet printer cartridge, wherein the ink jet printer cartridge is as defined in claim 22.

24. A composition comprising:
(a) a liquid medium comprising (i), (ii) or (iii):
    (i) a mixture of water and an organic solvent;
    (ii) an organic solvent free from water; or
    (iii) a low melting point solid; and (b) a dye of the Formula (1) or a salt thereof:

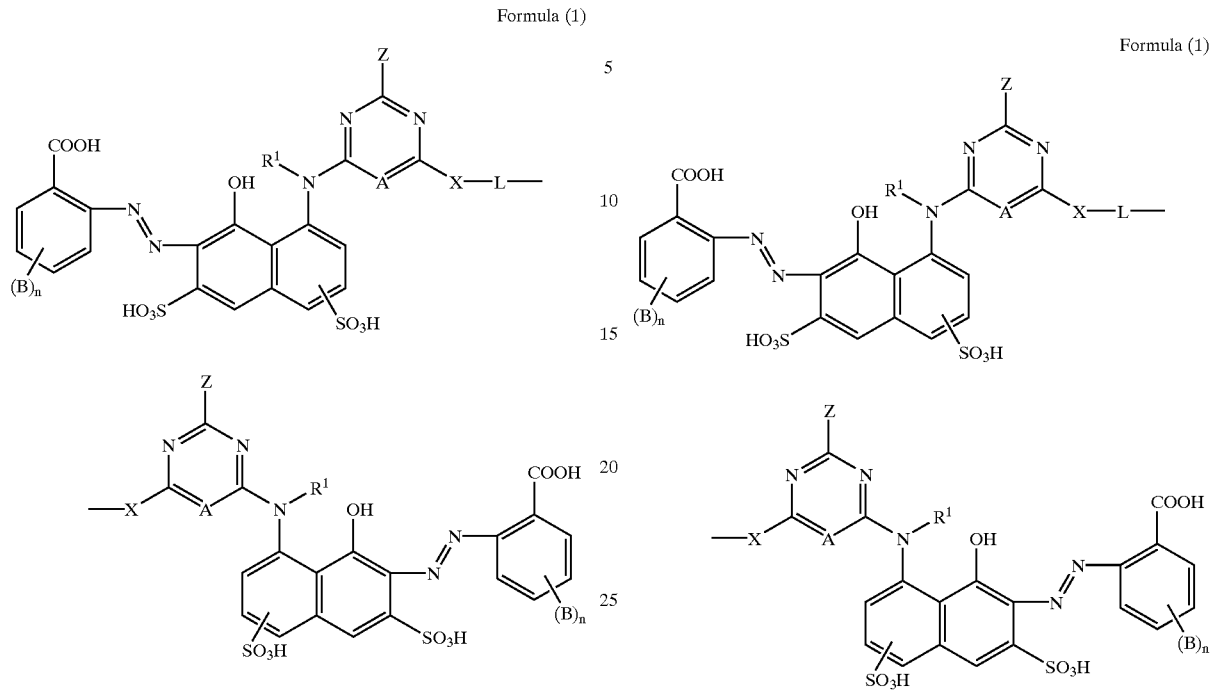

Formula (1)

wherein:
each A independently is N, C—Cl, C—CN or C—NO$_2$;
each B independently is a substituent other than —COOH;
L is optionally interrupted alkylene, optionally substituted by halo or —OH, wherein the optional interruption(s) are selected from the group consisting of —O—, —S—, —NR$^1$—, —CR$^1$=CR$^1$—, —C(O)— and —C(O)O—;
each Z independently is —SR$^2$, —OR$^3$, —NR$^4$R$^5$ or a labile atom or group;
each X independently is —S—, —O— or —NR$^1$—;
each R$^1$ independently is optionally substituted alkyl;
R$^2$, R$^3$, R$^4$ and R$^5$ are each independently H, optionally substituted alkyl, optionally substituted aryl or optionally substituted aralkyl; or
R$^4$ and R$^5$ together with the nitrogen to which they are attached form an optionally substituted five or six membered ring; and
each n independently is 0 to 4.

25. A composition comprising:
(a) a liquid medium comprising (i), (ii) or (iii):
  (i) a mixture of water and an organic solvent;
  (ii) an organic solvent free from water; or
  (iii) a low melting point solid; and
(b) a dye of the Formula (1) or a salt thereof:

Formula (1)

wherein:
each A independently is N, C—Cl, C—CN or C—NO$_2$;
each B independently is a substituent other than —COOH;
L is alkylene, optionally substituted by halo or —OH;
each Z independently is —SR$^2$, —OR$^3$, —NR$^4$R$^5$ or a labile atom or group;
each X independently is —S—, —O— or —NR$^1$—;
each R$^1$ independently is H or optionally substituted alkyl;
R$^2$, R$^3$, R$^4$ and R$^5$ are each independently H, optionally substituted alkyl, optionally substituted aryl or optionally substituted aralkyl; or
R$^4$ and R$^5$ together with the nitrogen to which they are attached form an optionally substituted five or six membered ring; and
each n independently is 0 to 4.

26. A composition according to claim 25, wherein in L, the alkylene has from 2 to 6 carbon atoms.

27. A composition according to claim 24 wherein the dye of Formula (1) is of Formula (2) or a salt thereof:

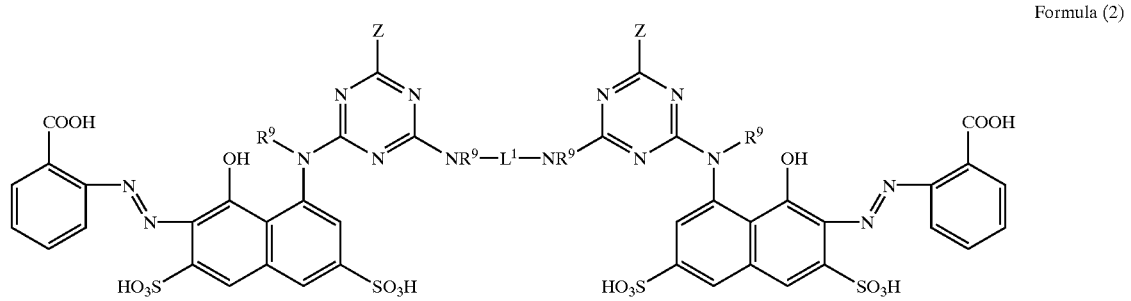

Formula (2)

wherein:
- $L^1$ is optionally interrupted $C_{2-20}$-alkylene, wherein the optional interruption(s) are selected from the group is consisting of —O—, —S—, —CR$^9$=CR$^9$— and —NR$^9$—;
- each $R^9$ independently is $C_{1-4}$-alkyl optionally substituted by —OH, —COOH, —SO$_3$H or —CN; and
- each Z independently is SR$^2$, —OR$^3$, —NR$^4$R$^5$ or a labile atom or group wherein R$^2$, R$^3$, R$^4$ and R$^5$ are each independently H, optionally substituted alkyl, optionally substituted aryl or optionally substituted aralkyl; or R$^4$ and R$^5$ together with the nitrogen to which they are attached form an optionally substituted five or six membered ring.

* * * * *